Sept. 9, 1924.
C. B. COLLINS
1,507,768
PORTABLE ELECTRIC LIGHT
Filed July 30, 1923     2 Sheets-Sheet 1
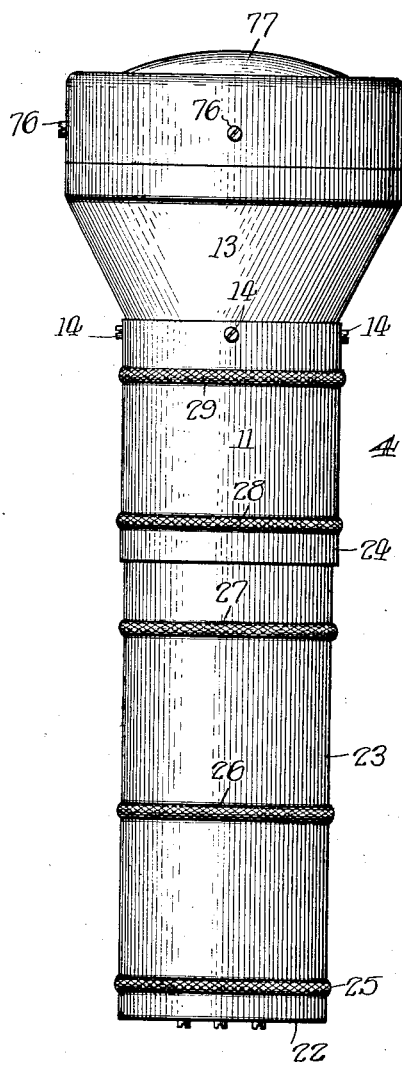
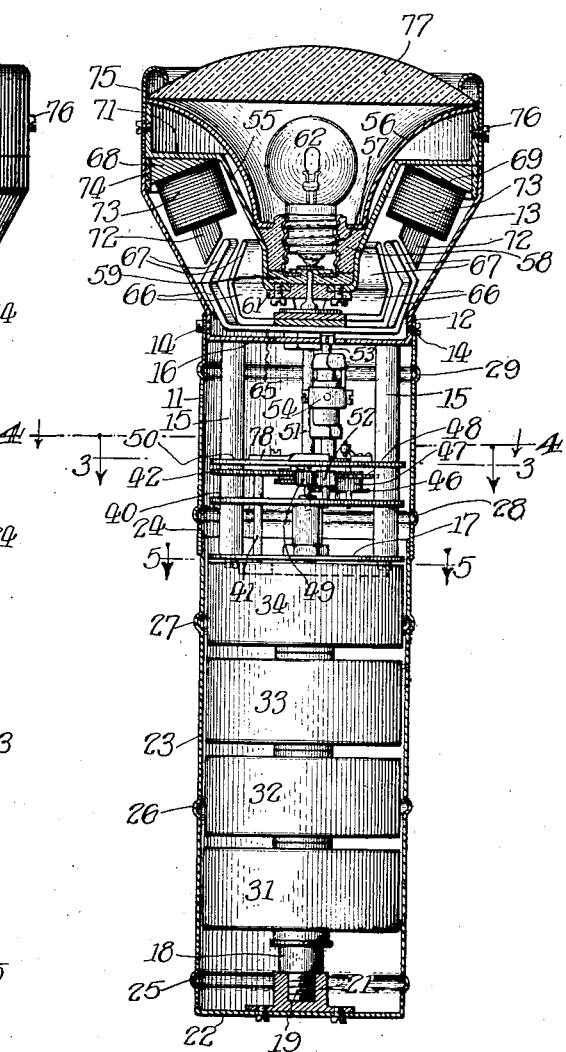

Sept. 9, 1924.
C. B. COLLINS
1,507,768
PORTABLE ELECTRIC LIGHT
Filed July 30, 1923     2 Sheets-Sheet 2
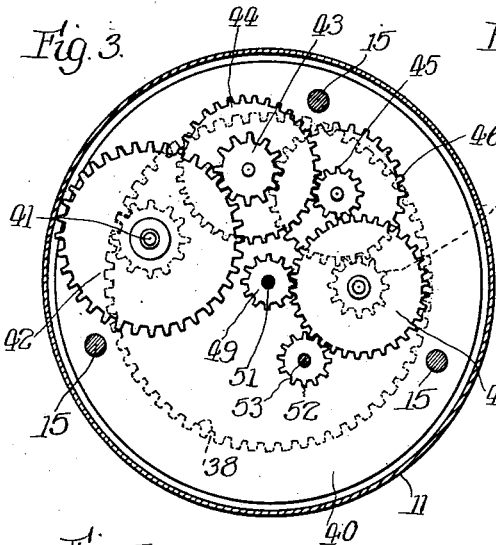
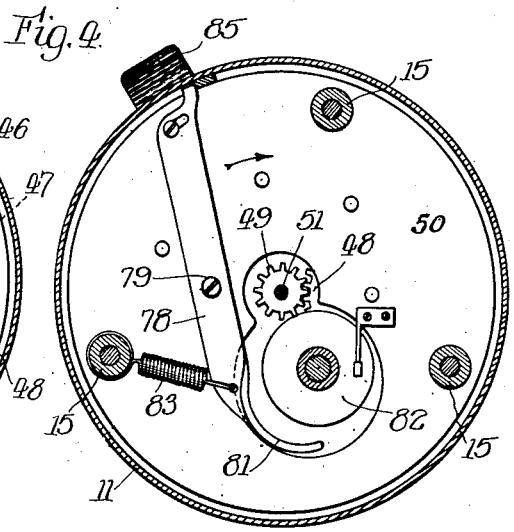
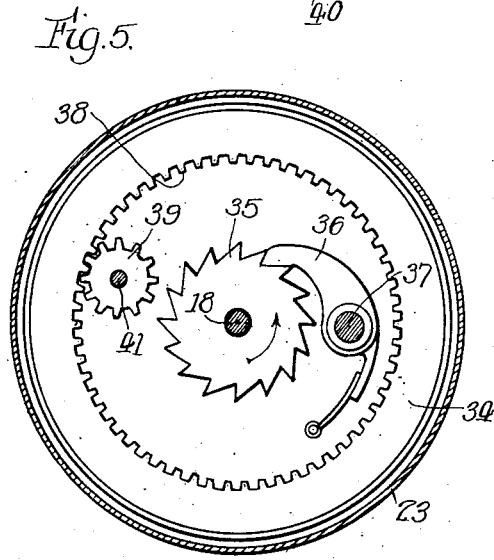
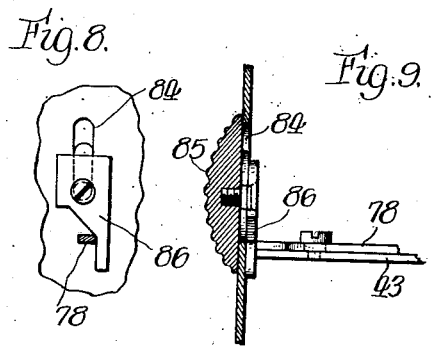
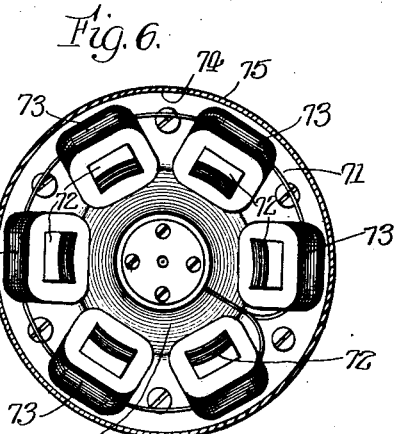

Patented Sept. 9, 1924.

1,507,768

UNITED STATES PATENT OFFICE.

CAP B. COLLINS, OF FRANKLIN, PENNSYLVANIA.

PORTABLE ELECTRIC LIGHT.

Application filed July 30, 1923. Serial No. 654,505.

*To all whom it may concern:*

Be it known that I, CAP B. COLLINS, a citizen of the United States, residing at Franklin, in the county of Venango and State of Pennsylvania, have invented certain new and useful Improvements in Portable Electric Lights, of which the following is a specification.

My invention pertains to features of novelty an improvement in electric lamps of the portable type designed and adapted to take the place of the so-called electric flash lamps employing small batteries which require more or less frequent replacement.

One leading object or purpose of the invention is the provision of an appliance of this general form which dispenses with, or avoids the use of, the short-lived batteries and, accordingly, my improved device incorporates an electric-generator and an associated spring-motor which may be wound up and employed to run or drive the generator for a substantial period of time to supply the electric current to the lamp-bulb, the latter being desirably supplied with an appropriate reflector.

The spring-motor is preferably equipped with a suitable governor, whereby the generator is actuated at a practically constant speed thus delivering to the electric-lamp circuit a current of substantially unvarying voltage.

The reflector, electric-lamp, and electric-dynamo are so constructed and associated together that they are more or less nested within one another, the generator, or at least a part of it, being on the exterior and partially enclosing the reflector which accommodates the electric-lamp bulb within it.

This construction results in a compact appliance which occupies comparatively small space, and the device as a whole is of pleasing appearance and of relatively small weight so that it may be easily carried around in the hand and used for the same purposes that the well-known flash-light, battery appliances are employed for, the new device being a convenient and desirable substitute for the structures at present on the market.

All of the parts of the appliance are preferably enclosed in a casing having one section revolubly mounted with relation to the remainder of the shell, such rotatable part being used by turning it to wind up the motor, the latter conveniently having a brake or stop for starting and terminating its operation.

To enable those skilled in the art to have a full and complete understanding of the invention and the several advantages accruing from its use, in the accompanying drawings, forming a part of this specification, and throughout the several views of which like reference characters are employed to refer to the same elements, I have illustrated a desirable and preferred embodiment of the invention, but it is to be understood that the invention is susceptible of other acceptable and satisfactory incorporations in physical form.

In these drawings:

Figure 1 is an elevation or side view of the new appliance;

Figure 2 is a longitudinal section through the same;

Figure 3 is an enlarged cross-section on line 3—3 of Figure 2;

Figure 4 is a similar cross-section on line 4—4 of Figure 2;

Figure 5 is a cross-section on line 5—5 of Figure 2;

Figure 6 is a face view of the generator stator and associated parts removed from the casing;

Figure 7 is a plan or face view of the generator rotor; and

Figures 8 and 9 are a fragmentary elevation and section, respectively, of the brake operating means for starting and stopping the spring-motor.

Referring to these drawings, it will be perceived that the appliance includes a stationary shell or casing section 11 receiving internally the inner, reduced-diameter part 12 of a flaring casing-section 13, the parts 11 and 12 being detachably fastened together by a number of screws 14, 14.

A plurality of inwardly-extended posts 15, 15 mounted on the end-wall 16 at their ends carry a round support-plate 17 providing a bearing for a shaft 18 having a threaded end 19 screwed into a screw-threaded socket 21 secured on the inner face of the end-wall 22 of a casing section 23 rotatable with respect to the section 11 and having a part 24 of reduced section received in the end of the latter.

To facilitate the turning of member 23, it and the other shell section 11, are provided with rings of knurling 25, 26, 27, 28 and 29.

Casing element 23 houses a plurality of inter-connected spiral springs 31, 32, 33 and 34 forming a spring-motor of known type, which needs no detailed description, except to state that the turning of shaft 18 with the casing member puts the springs under strain, shaft 18 having fastened thereto a ratchet-wheel 35 in cooperative relation with a spring-pressed dog 36 fulcrumed at 37 on the inner or under side of the supporting plate 17, and that the spring 34 has an internal-gear 38 in mesh with a small gear 39 on a shaft 41 having bearings in plate 17 and in one or both of a pair of similar plates 40 and 50 also mounted on the posts 15.

Between these latter plates and on suitable shafts there are a series of intermeshing gears provided for the purpose of rotating the generator-rotor at a much faster speed than the rotation of the spring-motor shaft, this gearing comprising cooperating pairs of gears 42—43, 44—45, 46—47, and 48—49 between shaft 41 and the centrally-disposed rotor-shaft 51, the lower end of which has a bearing in an end of shaft 18.

Gear 48 is also in mesh with a gear 52 on a governor-shaft 53 equipped with a speed governor 54 substantially like that of U. S. Patent 1,407,413, Hasselquist, centrifugal governor, granted February 21, 1922 and which consequently requires no further description.

A metal-shell 55 of the shape in cross-section shown in Figure 2 is internally fitted with a reflector 56, and between the inner portions of the two, a screw-threaded lamp-socket 57 is mounted in suitable insulation material 58, and the inner, central, apertured, end wall of shell 55 is equipped with a pair of complementary insulation elements 59 and 61 affording a bearing for the outer or upper end of the rotor-shaft 51, the end of which is in contact with the metal end wall of the lamp-socket adapted to receive the electric lamp-bulb 62.

The electric-generator rotor is mounted on shaft 51 between the members 61 and 16, and, in the present instance, comprises three, bent, magnet bars 63, 64, and 65 superposed on one another, all fastened at their centers to the shaft, and arranged at angles of 60 degrees to one another, the ends of each bar diverging outwardly at 66, 66 and then converging outwardly at 67, 67 forming pole-pieces in register and cooperating with the poles of the stator about to be described.

A metallic ring 68 with an inclined annular face 69 is secured to the part 71 of the shell 55 and projecting inwardly from such ring and converging toward one another are a plurality of laminated pole-pieces 72, six being present in this particular embodiment of the invention.

As is clearly shown, the end faces of these stator pole-pieces are oblique to the axes thereof and are substantially parallel to the pole-pieces of the rotor, the several stationary pole-pieces being fitted with their wire or magnet coils 73 properly connected together and to the electric-lamp socket, one element of which may conveniently be grounded.

When the parts are in assembled relation as shown in Figure 2, the ring 68 fits inside of the mouth of the enlarged end of casing 11, with a ring of insulation 74 between the two, the shell 55 having an outer casing member 75 fastened to it by screws 76 and demountably holding a lens 77 in place in front of the lamp and its reflector.

It will be seen, therefore, that the stator of the generator is so made that it encloses or encases the lamp-bulb and reflector at least partially and that the generator-rotor in part surrounds the socket receiving the lamp-bulb.

This makes a compact, simple, and relatively-inexpensive construction which is pleasing in general appearance and which is not unduly long or out of proportion.

So far as I am advised, I am the first person to mount the electric-generator in the head of an appliance of this kind in the manner fully described and illustrated.

The spring-motor having stored up a supply of energy by the winding up of its springs through the relative rotative movements of the casing-sections, the generator will be operated at a practically constant speed and the lamp rendered and maintained incandescent for a substantial period of time until the motor runs down.

In order that the motor and rotor may be started and stopped at will, a brake-lever 78 (Figure 4) is fulcrumed at 79 on plate 50 and has a curved end 81 adapted to act as a brake on the disk 82 forming part of the governor, a coiled spring 83 normally pulling the brake away from the disk.

In a longitudinal slot 84 (Figures 8 and 9) in casing section 11 a thumb-piece 85, carrying a cam-bar 86 inside of the casing is slidable to coact with a reduced end portion of the brake-lever.

In one position of the member 85, the brake will be operative to stop the motor, and in the other position, the brake will be inoperative, permitting the motor to run the generator.

From an understanding of this construction and its mode of operation, it will be clear that the above-specified purposes and objects and others have been attained in a satisfactory manner in the new device, the structural details of which, as well as several of its major features, are subject to material modification without departure from the heart and essence of the invention as defined by the appended claims.

I claim:

1. In a portable electric-light appliance, the combination of a portable casing, an electric-generator in said casing, a spring-motor in said casing connected to drive said generator, a reflector in said casing enclosed at least in part inside of said generator, an electric-lamp bulb in said reflector, and means to permit manual winding up of said motor.

2. In a portable electric-light appliance, the combination of a portable casing, an electric-generator with inwardly-converging pole-pieces in said casing, a spring-motor in said casing connected to drive said generator, means permitting the manual winding up of said motor, a reflector enclosed at least in part by said pole-pieces, and an electric-lamp bulb in said reflector and in the circuit of said generator.

3. In a portable electric-light appliance, the combination of a portable casing, an electric-generator in said casing having a stator and a rotor, a spring-motor in said casing connected to drive said rotor, means permitting manual winding up of said motor, a reflector, an electric-lamp socket enclosed at least in part by said rotor, and in the electric circuit of said generator, and an electric-lamp bulb in said reflector and socket.

4. In a portable electric-light appliance, the combination of a portable casing, an electric-generator in said casing having a stator and a rotor, a spring-motor in said casing connected to drive said rotor, means permitting manual winding up of said motor, a reflector enclosed at least in part by said stator, an electric-lamp socket in the electric circuit of said generator and enclosed at least in part by said rotor, and an electric-lamp bulb in said reflector and socket.

5. In a portable electric-light appliance, the combination of a casing, an electric-generator in said casing having a stator with a plurality of inwardly-converging pole-pieces having outwardly-converging end faces and a rotor having pole-pieces with corresponding converging faces coacting with the end faces of the stator pole-pieces, a spring-motor in said casing connected to drive said rotor, means permitting manual winding up of said motor, a reflector enclosed at least in part by said stator pole-pieces, and an electric-lamp bulb in said reflector and in the electric circuit of said generator.

6. In a portable electric-light appliance, the combination of a casing including two relatively-rotatable sections, an electric-generator in said casing having a stator with inwardly-converging pole-pieces having outwardly-converging end faces and a rotor composed of a plurality of bent bars bearing centrally on and secured to one another but disposed at different angles about their common axis, each bar having a central part with outwardly-diverging intermediate sections terminating in outwardly-converging parts in proximity to said end faces of the stator pole-pieces, a spring-motor in said casing connected to drive said rotor, means permitting the manual winding up of said motor by the relative turning of said casing sections, a governor regulating the speed of the rotor, a reflector enclosed at least in part by said stator, a lamp socket in the electric circuit of said generator and enclosed at least in part by said rotor, and an electric-lamp bulb in said socket and reflector.

In witness whereof I have hereunto set my hand and seal.

CAP B. COLLINS. [L. S.]